US005504696A

United States Patent [19]

Debes

[11] Patent Number: 5,504,696

[45] Date of Patent: Apr. 2, 1996

[54] USER INTERFACE CALIBRATION AND ALIGNMENT DEVICE

[75] Inventor: Jeffrey D. Debes, Rochester, N.Y.

[73] Assignee: Xerox Corporation, Stamford, Conn.

[21] Appl. No.: 176,592

[22] Filed: Jan. 3, 1994

[51] Int. Cl.[6] .................... G01D 9/00

[52] U.S. Cl. .................... 364/571.01; 395/138; 395/139; 355/204

[58] Field of Search .................... 364/571.01; 395/133, 395/135, 138, 139; 345/121, 126, 127, 213, 56, 136, 149, 162, 168, 178; 382/10, 16, 17, 22, 25, 28, 29, 30, 41, 42, 44–49, 58, 59; 355/218, 204

[56] References Cited

U.S. PATENT DOCUMENTS

| | | | |
|---|---|---|---|
| 4,523,188 | 6/1985 | Huber | 345/178 |
| 4,737,773 | 4/1988 | Kobayashi | 345/178 |
| 5,297,254 | 3/1994 | Arai et al. | 345/162 |
| 5,325,475 | 6/1994 | Poggio et al. | 395/133 |
| 5,333,255 | 7/1994 | Damouth | 395/135 |

OTHER PUBLICATIONS

Touchmate Visage, 1992, all pages(pp. 1–8).

*Primary Examiner*—Emanuel T. Voeltz
*Assistant Examiner*—Hal D. Wachsman
*Attorney, Agent, or Firm*—Don L. Webber

[57] ABSTRACT

An user interface edit pad for accepting two or three dimensional information for input into a computer, printer, copier or other electronic device. The user interface apparatus includes an edit pad which may be aligned and calibrated with an electronically stored image. The edit pad includes a pressure sensitive surface for defining an input pattern according to pressure applied to the surface; the input pattern is made up of a plurality of input points, each input point having an x, y and or z input coordinates. The user interface also includes a processor for storing an image having a plurality of image points each associated with corresponding input points of the input pattern. Each coordinate of the image points in the electronic image is individually addressable by the processor, such that the processor is operable to calibrate each input point relative to each corresponding image point and to adjustably align the input pattern with the image.

22 Claims, 4 Drawing Sheets

USER INTERFACE CALIBRATION AND ALIGNMENT DEVICE

The present invention relates to a user interface calibration and alignment device, and more particularly to a device for aligning and calibrating user input and edit pads for inputting information into a computerized apparatus such as an electrophotographic printing machine.

User-machine interface devices are useful in a broad range of applications when providing machine instructions to multifunctional copying and/or printing devices. In electrophotographic applications such as xerography, users may wish to input and edit a variety of types of information, as well as adjust and modify a variety of machine output parameters such as copy or print contrast, color, and others.

Traditional input or edit pads often suffer from various point interface alignment and calibration problems. For example, if an operator wishes to designate a point, line or area of a document to be scanned, displayed on a screen or stored in memory using a finger or edit pen, known input pads may only permit the operator to make rough designations of the desired point, line or area. In such cases, a user may be required to repeatedly attempt to perform edit or input tasks or to settle for poor edit pad alignment. Graphics, design, and analytical implementations (such as construction/engineering applications, perspective renderings, solid object modeling and design analysis) are just a few examples of situations in which difficulties can arise when operators may be undesirably forced to use a misaligned or miscalibrated input or edit pad device. Misalignment of less than 1 mm may degrade edit/input pad operations, while higher level shift, pen tilt or misalignment conditions may cause serious difficulties and significantly reduce output quality.

More specifically, in digital printer or copier applications, a raster output scanner may be controlled (in part) by input or edit pads. Such pads can be adapted to send signals to a user interface and associated computer, such as to provide inputs for modifying or creating an electrostatic latent image to be reproduced on a photoreceptor. In a digital copier, an edit or input device such as a raster input scanner may likewise be controlled by an input pad device and an electronic subsystem adapted to create, modify and otherwise provide an electrostatic latent image to the photoreceptor.

In the case of multicolor copiers and printers, the complexity of editing as it relates to the image transfer process may be compounded, as multiple colors can require adjustment prior to printing. Misaligned or uncalibrated input and edit devices can cause misregistration of the various colors and images, greatly reducing the appearance and usefulness of a multicolor copy or print. Properly aligned and calibrated input devices can speed and simplify the operator actions required to implement document creation, modification, coloration, and other processes. Alignment input pad difficulties can also be compounded when users have different finger widths, hold an edit pen at differing positions or tilt angles, or other individualized input factors. An aligned and calibrated input or edit pad device capable of accepting two (or three) dimensional (x, y and/or z coordinate) input may simplify and enhance editing and input operations.

Various approaches have been employed to input information into a device using an input or edit pad, including the following disclosures that may be relevant:

U.S. Pat. No. 5,231,698

Patentee: Forcier

Issued: Jul. 27, 1993

U.S. Pat. No. 5,220,649

Patentee: Forcier

Issued: Jun. 15, 1993

U.S. Pat. No. 5,170,348

Patentee: Hirose

Issued: Dec. 8, 1992

U.S. Pat. No. 5,053,585

Patentee: Yaniger

Issued: Oct, 1, 1991

U.S. Pat. No. 4,963,702

Patentee: Yaniger et al.

Issued: Oct. 16, 1990

U.S. Pat. No. 4,810,992

Patentee: Eventoff

Issues: Mar. 7, 1989

U.S. Pat. No. 4,517,546

Patentee: Kakuhashi et al.

Issued: May 14, 1985

U.S. Pat. No. 4,455,450

Patentee: Margolin

Issued: Jun. 19, 1984

Relevant portions of the foregoing disclosures may briefly be described as follows:

U.S. Pat. No. 5,231,698 to Forcier discloses a pen-based processor for inputting and editing script. User control of various functions is achieved by an "intuitive and interactive set of user gestures." The system infers customary writing conventions, which may be overridden by a user.

U.S. Pat. No. 5,220,649 to Forcier also discloses a pen-based processor for inputting and editing script. User control of various functions is achieved by an user gestures and commands. Documents may be formatted in lined areas. This system also uses customary writing conventions, which may be altered by a user.

U.S. Pat. No. 5,170,348 to Hirose discloses an alphanumeric character input device, which includes a panel for pen-based inputting and editing functions. User control of various functions is achieved by a contact pen entries. A hand rest area is provided adjacent to the input pad to prevent false entries and provide user hand support. A memory may store the inputted information, and an output display or other means is provided for.

U.S. Pat. No. 5,053,585 to Yaniger discloses a multipurpose keyboard incorporating an electronic pressure sensing device and a digitizer pad featuring spatial minimization of a pressure contact area capable of locating the leading and trailing edges of the pressure contact area. A processor coupled to the electronic pressure sensing device is programmed to sense when various regions on a simple, fully interchangeable template overlay and the underlying electronic pressure sensing device are depressed. The sensed region is associated by the processor with a particular key identification on the template overlay. The variation of the resistance in the digitizer pad enables the processor to detect the actuation of more than one key on the template overlay at the same time to detect key rollover.

U.S. Pat. No. 4,963,702 to Yaniger et al. discloses a digitizer pad that includes at least one digitizer ply where each digitizer ply has a first and a second resistor strip, each with a resistance gradient along its length, oriented in a spaced apart relationship. A plurality of conductor traces are interconnected along the length of each resistor strip to extend toward and be interleaved between each other to define a sensor pad region. Each sensor pad region defines a dimensional direction. A shunt ply is positioned to face the sensor pad region in normally nonconductive relationship so that when a selected area is pressed into contact with the conductor traces, conduction between adjacent conductor traces via the shunt ply will occur in the selected contact area. The selected contact area has a first edge and a second edge opposite the first edge along the defined dimensional direction. A voltage source is coupled across the first resistor strip and a switch is coupled across the ends of the second resistor strip for alternately coupling one end and then the other end of the second resistor strip to a utilization. The voltage and hence the location of the first edge and then the second edge of the contact area along the dimensional direction is thereby determined.

U.S. Pat. No. 4,810,992 to Eventoff discloses a digitizer pad having at least two base plies, each having thereon at least three terminals, a resistor ply disposed between two of the terminal with a plurality of conductors extending from each resistor ply which are spaced apart and interleaved with a plurality of conductors extending from each third terminal. The conducting surfaces of the respective base plies face each other and are sandwiched about a nonconductive ply that includes a pressure sensitive conductive layer on each side, the area of which layer covers a portion of the area encompassed by the interleaved conductors on each base ply. The resistor plies and conductors on each base ply are at predetermined angles to those on the base ply, hence the conductors of each base ply form two predefined axis. A voltage source is sequentially coupled, by suitable switching means, across a selected pair of terminals on each ply to measure the selected location along the parameter dimension defined by the terminals across which the voltage source is coupled. Hence, the spatial location of a force applied to the digitizer pad along any one or more axes in a plane is determinable as well as the magnitude of the force applied generally perpendicular to that plane.

U.S. Pat. No. 4,517,546 to Kakuhashi et al. discloses a resistor sheet input tablet comprising two resistor sheets each provided at two opposite edges with electrodes. One rectangular resistor sheet lies perpendicularly to those on the other resistor sheet resulting in a two dimensional input construction comprising a main resistor layer consisting of a thin metal film deposited thereon which in turn is bonded to an electrically insulating layer and a protective resistor layer formed on the surface of the main resistor layer.

U.S. Pat. No. 4,455,450 to Margolin et al. discloses a digitizer tablet with an air or fluid filled pocket formed by two sealed sheets of insulating material. Perpendicular row arrays of electrical conductors defined on the inner faces of the two sheets urged into contact with each other generate the x and y coordinates for the device.

In accordance with one aspect of the present invention, there is provided a user interface having an electronically stored image. The user interface includes an edit pad for defining an input pattern having a plurality of input points, each input point having an x input coordinate and a y input coordinate. The user interface also includes a processor for storing the image, wherein the image corresponds to the input pattern, the image having a plurality of image points each associated with corresponding input points of the input pattern, each image point having an x image coordinate and a y image coordinate, each image coordinate of the image points in the electronic image being individually addressable by the processor. The processor is thereby operable to calibrate each input point relative to each corresponding image point and to adjustably align the input pattern with the image.

In accordance with another aspect of the present invention, there is provided an electrophotographic printing machine having an electronically stored image. The printing machine an edit pad for defining an input pattern having a plurality of input points, each input point having an x input coordinate and a y input coordinate. The user interface also includes a processor for storing the image, wherein the image corresponds to the input pattern, the image having a plurality of image points each associated with corresponding input points of the input pattern, each image point having an x image coordinate and a y image coordinate, each image coordinate of the image points in the electronic image being individually addressable by the processor. The processor is thereby operable to calibrate each input point relative to each corresponding image point and to adjustably align the input pattern with the image.

The present invention will be described in detail with reference to the following drawings, in which like reference numerals are used to refer to like elements. The various aspects of the present invention will become apparent as the following description proceeds and upon reference to the drawings, in which:

Figure 1:
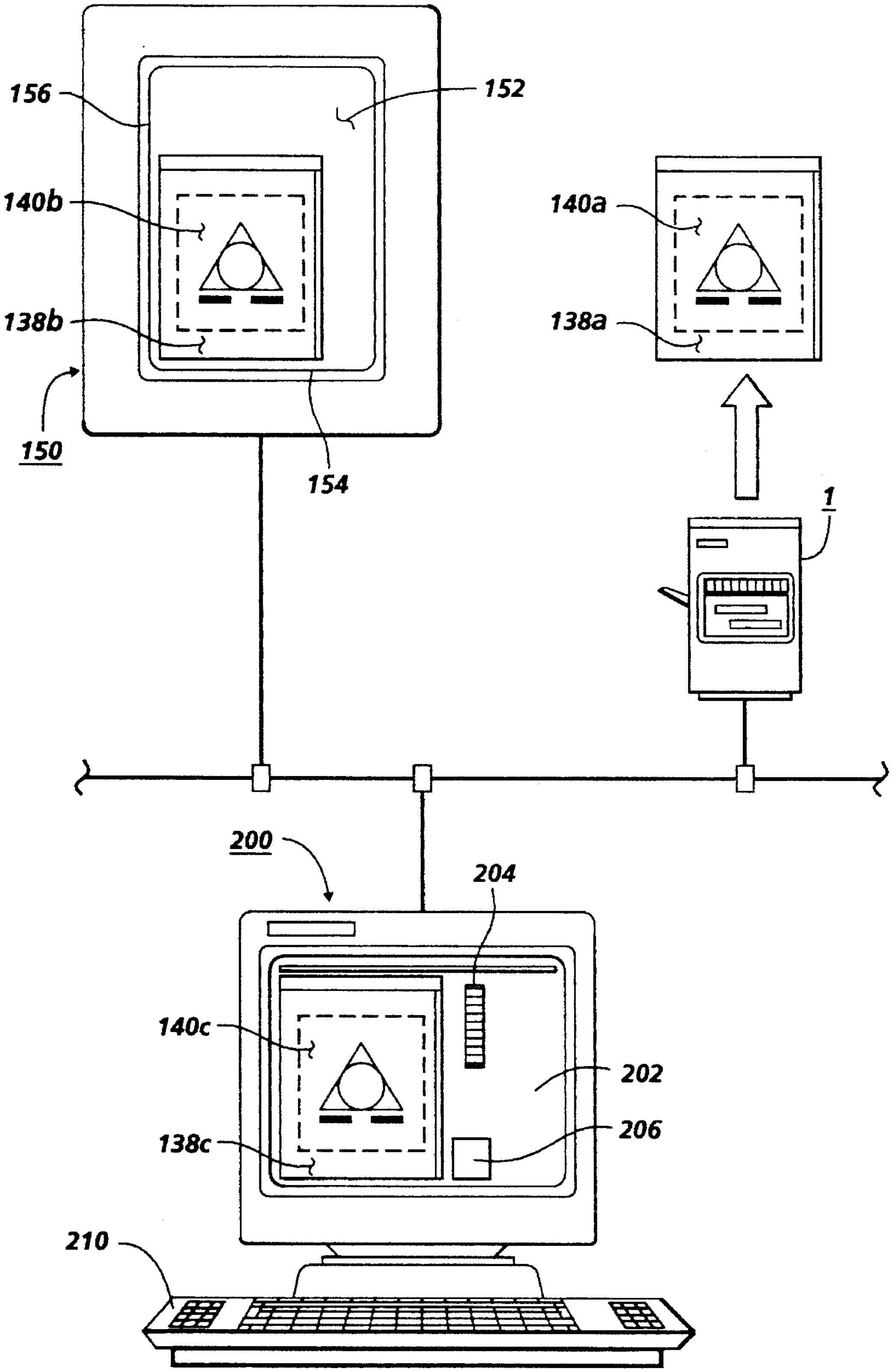
FIG. 1 is a schematic view showing a user interface and edit pad incorporating features of the present invention.

While the present invention will hereinafter be described in connection with preferred embodiments, it will be understood that it is not intended to limit the invention to a particular embodiment. On the contrary, it is intended to cover all alternatives, modifications and equivalents as may be included within the spirit and scope of the invention as defined by the appended claims.

For a general understanding of the features of the present invention, reference is made to the drawings. In the drawings, like reference numerals have been used throughout to designate like elements. It will become evident from the following discussion that the present invention and the various embodiments set forth herein are suited for use in a wide variety of printing and copying systems, and are not necessarily limited in its application to the particular systems shown herein.

Figure 4:
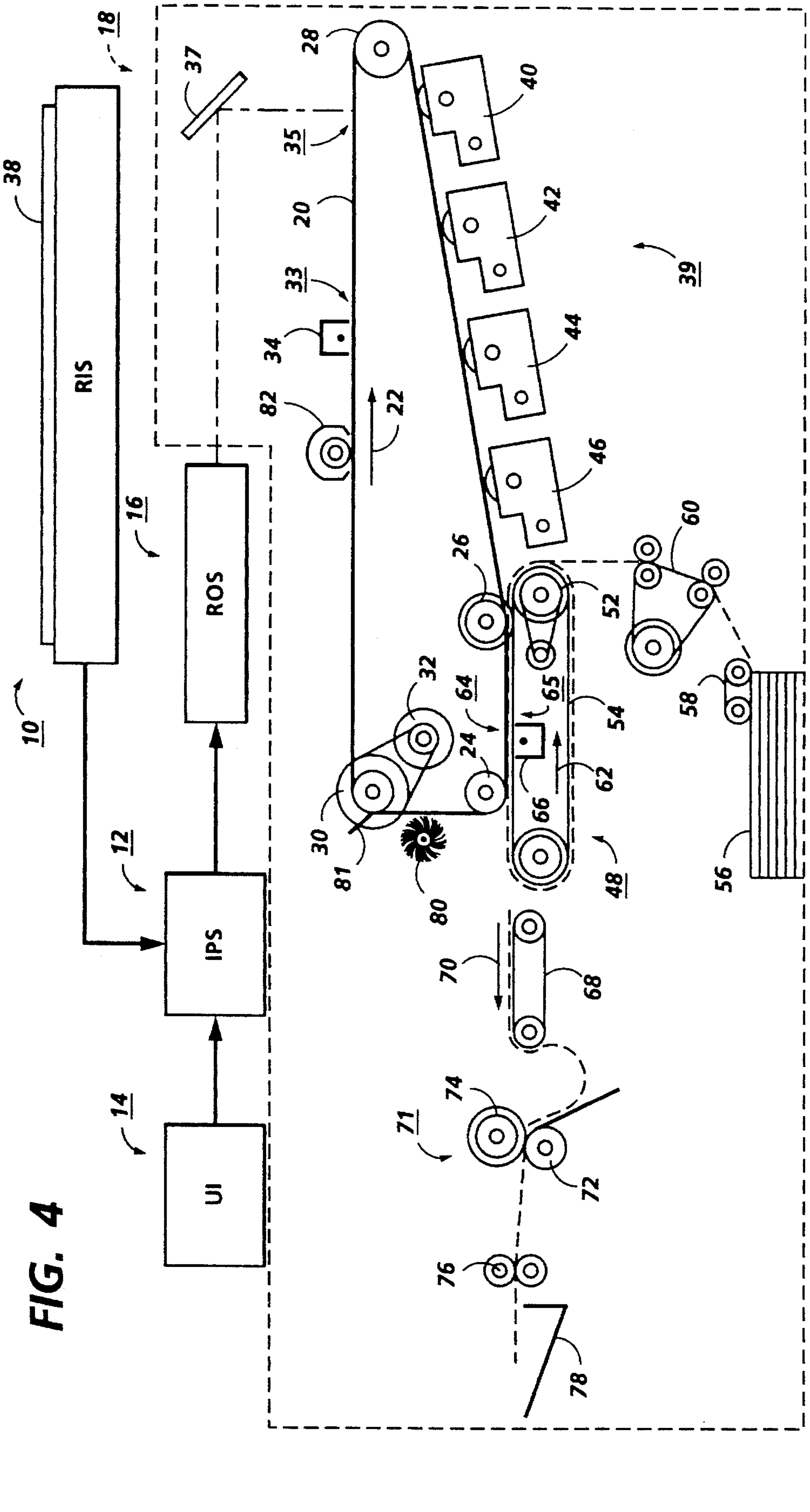
FIG. 4 is a schematic elevational view showing an exemplary electrophotographic printing machine which may incorporate the present invention therein.

To begin by way of general explanation, FIG. 4 is a schematic elevational view showing an electrophotographic printing machine which may incorporate features of the present invention therein. It will become evident from the following discussion that the present invention is equally well suited for use in a wide variety of copying and printing systems as well as many other data input and feature selection applications, and is not necessarily limited in its application to the particular systems shown herein.

As shown in FIG. 4, during operation of the printing system, a multiple color original document 38 is positioned on a raster input scanner (RIS), indicated generally by the reference numeral 10. The RIS contains document illumination lamps, optics, a mechanical scanning drive, and a charge coupled device (CCD array). The RIS captures the entire image from original document 38 and converts it to a series of raster scan lines and moreover measures a set of primary color densities, i.e. red, green and blue densities, at each point of the original document. This information is transmitted as electrical signals to an image processing system (IPS), indicated generally by the reference numeral 12. IPS 12 converts the set of red, green and blue density signals to a set of colorimetric coordinates.

The IPS contains control electronics which prepare and manage the image data flow to a raster output scanner (ROS), indicated generally by the reference numeral 16. A user interface (UI), indicated generally by the reference numeral 14, is in communication with IPS 12, as well as with other locations as desired in the printer and/or marking system, so as to control the various functions and outputs associated therewith. Computerized user interface 14 (such as is described in greater detail in association with FIGS. 1 through 3 herein) may be used to create, modify and print text and images. UI 14 enables an operator to control the various operator adjustable functions. The operator actuates the appropriate input pad and/or keys of UI 14 (shown in FIGS. 1 and 3) to adjust the parameters of a display screen as well as those in a output print or copy. UI 14 may include an adjustably alignable input pad as described in greater detail in association with FIGS. 1 through 3 herein, for providing various operator interface functions with the printer and/or marking system. The output signal from UI 14 is transmitted to IPS 12.

The IPS then transmits signals corresponding to the desired image to ROS 16, which creates the output copy image. ROS 16 includes a laser with rotating polygon mirror blocks. Preferably, a nine facet polygon is used. The ROS illuminates, via mirror 37, the charged portion of a photoconductive belt 20 of a printer or marking engine, indicated generally by the reference numeral 18, at a rate of about 400 pixels per inch, to achieve a set of subtractive primary latent images. The ROS will expose the photoconductive belt to record three latent images which correspond to the signals transmitted from IPS 12. One latent image is developed with cyan developer material. Another latent image is developed with magenta developer material and the third latent image is developed with yellow developer material. These developed images are transferred to a copy sheet in superimposed registration with one another to form a multicolored image on the copy sheet. This multicolored image is then fused to the copy sheet forming a color copy.

With continued reference to FIG. 4, printer or marking engine 18 is an electrophotographic printing machine. Photoconductive belt 20 of marking engine 18 is preferably made from a polychromatic photoconductive material. The photoconductive belt moves in the direction of arrow 22 to advance successive portions of the photoconductive surface sequentially through the various processing stations disposed about the path of movement thereof. Photoconductive belt 20 is entrained about transfer rollers 24 and 26, tensioning roller 28, and drive roller 30. Drive roller 30 is rotated by a motor 32 coupled thereto by suitable means such as a belt drive. As roller 30 rotates, it advances belt 20 in the direction of arrow 22.

Initially, a portion of photoconductive belt 20 passes through a charging station, indicated generally by the reference numeral 33. At charging station 33, a corona generating device 34 charges photoconductive belt 20 to a relatively high, substantially uniform potential.

Next, the charged photoconductive surface is rotated to an exposure station, indicated generally by the reference numeral 35. Exposure station 35 receives a modulated light beam corresponding to information derived by RIS 10 having multicolored original document 38 positioned thereat. The modulated light beam impinges on the surface of photoconductive belt 20. The beam illuminates the charged portion of the photoconductive belt to form an electrostatic latent image. The photoconductive belt is exposed three times to record three latent images thereon.

After the electrostatic latent images have been recorded on photoconductive belt 20, the belt advances such latent images to a development station, indicated generally by the reference numeral 39. The development station includes four individual developer units indicated by reference numerals 40, 42, 44 and 46. The developer units are of a type generally referred to in the art as "magnetic brush development units." Typically, a magnetic brush development system employs a magnetizable developer material including magnetic carrier granules having toner particles adhering triboelectrically thereto. The developer material is continually brought through a directional flux field to form a brush of developer material. The developer material is constantly moving so as to continually provide the brush with fresh developer material. Development is achieved by bringing the brush of developer material into contact with the photoconductive surface. Developer units 40, 42, and 44, respectively, apply toner particles of a specific color which corresponds to the compliment of the specific color separated electrostatic latent image recorded on the photoconductive surface. As set forth above, UI 14 of the present invention may be used to control the various functions of the developer units indicated by reference numerals 40, 42, 44 and 46, such as color intensity, darkness, and numerous other functions.

The color of each of the toner particles is adapted to absorb light within a preselected spectral region of the electromagnetic wave spectrum. For example, an electrostatic latent image formed by discharging the portions of charge on the photoconductive belt corresponding to the green regions of the original document will record the red and blue portions as areas of relatively high charge density on photoconductive belt 20, while the green areas will be reduced to a voltage level ineffective for development. The charged areas are then made visible by having developer unit 40 apply green absorbing (magenta) toner particles onto the electrostatic latent image recorded on photoconductive belt 20. Similarly, a blue separation is developed by developer unit 42 with blue absorbing (yellow) toner particles, while the red separation is developed by developer unit 44 with red absorbing (cyan) toner particles. Developer unit 46 contains black toner particles and may be used to develop the electrostatic latent image formed from a black and white original document. Each of the developer units is moved into and out of an operative position. In the operative position, the magnetic brush is substantially adjacent the photoconductive belt, while in the nonoperative position, the magnetic brush is spaced therefrom. During development of each electrostatic latent image, only one developer unit is in the operative position, the remaining developer units are in the nonoperative position. This insures that each electrostatic latent image is developed with toner particles of the appropriate color without commingling.

After development, the toner image is moved to a transfer station, indicated generally by the reference numeral 65. Transfer station 65 includes a transfer zone, generally indicated by reference numeral 64. In transfer zone 64, the toner image is transferred to a sheet of support material, such as plain paper or other sheets. At transfer station 65, a sheet transport apparatus, indicated generally by the reference numeral 48, moves the sheet into contact with photoconductive belt 20. Sheet transport 48 has a pair of spaced belts 54 entrained about a pair of substantially cylindrical rollers; a motor (not shown) provides power to one of these rollers (52). A sheet gripper 84 (not shown in FIG. 4) extends between belts 54 and moves in unison therewith. A sheet 25 is advanced from a stack of sheets 56 disposed on a tray. A friction retard feeder 58 advances the uppermost sheet from stack 56 onto a pre-transfer transport 60. Transport 60 advances sheet 25 (not shown in FIG. 4) to sheet transport 48. Sheet 25 is advanced by transport 60 in synchronism with the movement of the sheet gripper. As belts 54 move in the direction of arrow 62, the sheet moves into contact with the photoconductive belt, in synchronism with the toner image developed thereon. In transfer zone 64, a corona generating device 66 sprays ions onto the backside of the sheet so as to charge the sheet to the proper magnitude and polarity for attracting the toner image from photoconductive belt 20 thereto. The sheet remains secured to the sheet gripper so as to move in a recirculating path for three cycles. In this way, three different color toner images are transferred to the sheet in superimposed registration with one another.

One skilled in the art will appreciate that the sheet may move in a recirculating path for four cycles when under color black removal is used. Each of the electrostatic latent images recorded on the photoconductive surface is developed with the appropriately colored toner and transferred, in superimposed registration with one another, to the sheet to form the multicolor copy of the colored original document.

After the last transfer operation, the sheet transport system directs the sheet to a vacuum conveyor 68. Vacuum conveyor 68 transports the sheet, in the direction of arrow 70, to a fusing station, indicated generally by the reference numeral 71, where the transferred toner image is permanently fused to the sheet. The fusing station includes a heated fuser roll 74 and a pressure roll 72. The sheet passes through the nip defined by fuser roll 74 and pressure roll 72. The toner image contacts fuser roll 74 so as to be affixed to the sheet. Thereafter, the sheet is advanced by a pair of rolls 76 to a catch tray 78 for subsequent removal therefrom by the machine operator.

The final processing station in the direction of movement of belt 20, as indicated by arrow 22, is a photoreceptor cleaning apparatus. A rotatably mounted fibrous brush 80 may be positioned in the cleaning station, along with cleaning blade 81, and maintained in contact with photoconductive belt 20 to remove residual toner particles remaining after the transfer operation. Thereafter, lamp 82 illuminates photoconductive belt 20 to remove any residual charge remaining thereon prior to the start of the next successive cycle.

FIG. 1 shows a user interface system such as may be employed with or as UI 14 of a digital printer or copier as shown in FIG. 4. The user interface system includes an edit pad 150, having a pressure sensitive editing surface 152. Points, lines or figures may be inputted to a processor according to electrical signals generated by pressure applied by an edit pen (not shown), manual pressure by a user's finger, or other methods. The editing surface 152 of edit pad 150 may be bordered by guide portions 154 and 156 for aligning sheet **138*b* on editing surface 152. Sheet 138*b* is shown placed over editing surface 152, and flush with guide portions 154 and 156. Sheet 138*b* includes an image or pattern 140*b*, which in this case is an alignment test image. Pressure sensitive surface 152 on edit pad 150 is configured to designate x and y input coordinates for each point of pattern 140*b*, according to pressure or other physical designation of those points. The output from pressure sensitive surface 152 on edit pad 150 may be provided to an integral processor or a processor associated with printer 1 (such as shown in FIG. 4), user interface display 200** and/or other external device (not shown).

FIG. 1 also shows a user interface display 200, coupled with an entry keyboard 210. Electronic document **138*c* is shown displayed on screen 202. Electronic document 138*c* includes electronic image or pattern 140*c* thereon, which in this case is an alignment test image. An alignment scale 204 may be displayed on screen 202, for indicating and adjusting point alignment between pattern 140*a* on sheet 138*a*, pattern 140*b* on sheet 138*b*, and/or electronic pattern 140*c* of electronic document 138*c*. Display areas of screen 202 may also include window portions 206 for displaying edit pad to peripheral device alignment or other operator initiated functions of edit pad 150, display 200 or printer 1**.

FIG. 1 also shows sheet **138*a*, which may be an original document having displayed thereon pattern elements 142 and 144. Sheet 138*a* with pattern elements 142 and 144 may be scanned using a RIS such as shown in FIG. 4. Alternatively, sheet 138 may also be an output copy of a printing machine such as shown in FIG. 4, used for the purpose of visually checking edit pad 150 alignment with the electronic image printed by printer 1 and/or with pattern 140*c* of electronic document 138*c* as displayed on screen 202. As a user traces pattern 140*b* onto edit pad 150, sheet 138*a* may print a readout or superimposed patterns 140*a* and 140*b* indicating alignment or misalignment between electronic document 138*c* as displayed on screen 202 and edit pad 150. FIG. 1 shows patterns 138*a*, 138*b* and 138*c* as including curved and straight lines intersecting at various points on the document; such a pattern can test the various alignment and calibration aspects of the edit pad as it interfaces with the RIS, printer and display screen. Alignment and calibration can be completed with as few as two reference points in the pattern to be used. An abbreviated method can include only verifying selected points on patterns 138*a*, 138*b* and 138*c*, rather than tracing each line and curve over the edit pad. Edit pad alignment may differ from user to user; for example, an edit pen held by a left handed user will provide different input points than the same edit pen held by a right handed user. As such, edit pad alignment may be tailored (and stored in a processor) according to different users. The alignment and calibration of edit pad 150 relative to display 200, RIS 10 and printer 1 are described in greater detail in association with the block diagram shown in FIG. 2**.

Figure 2:
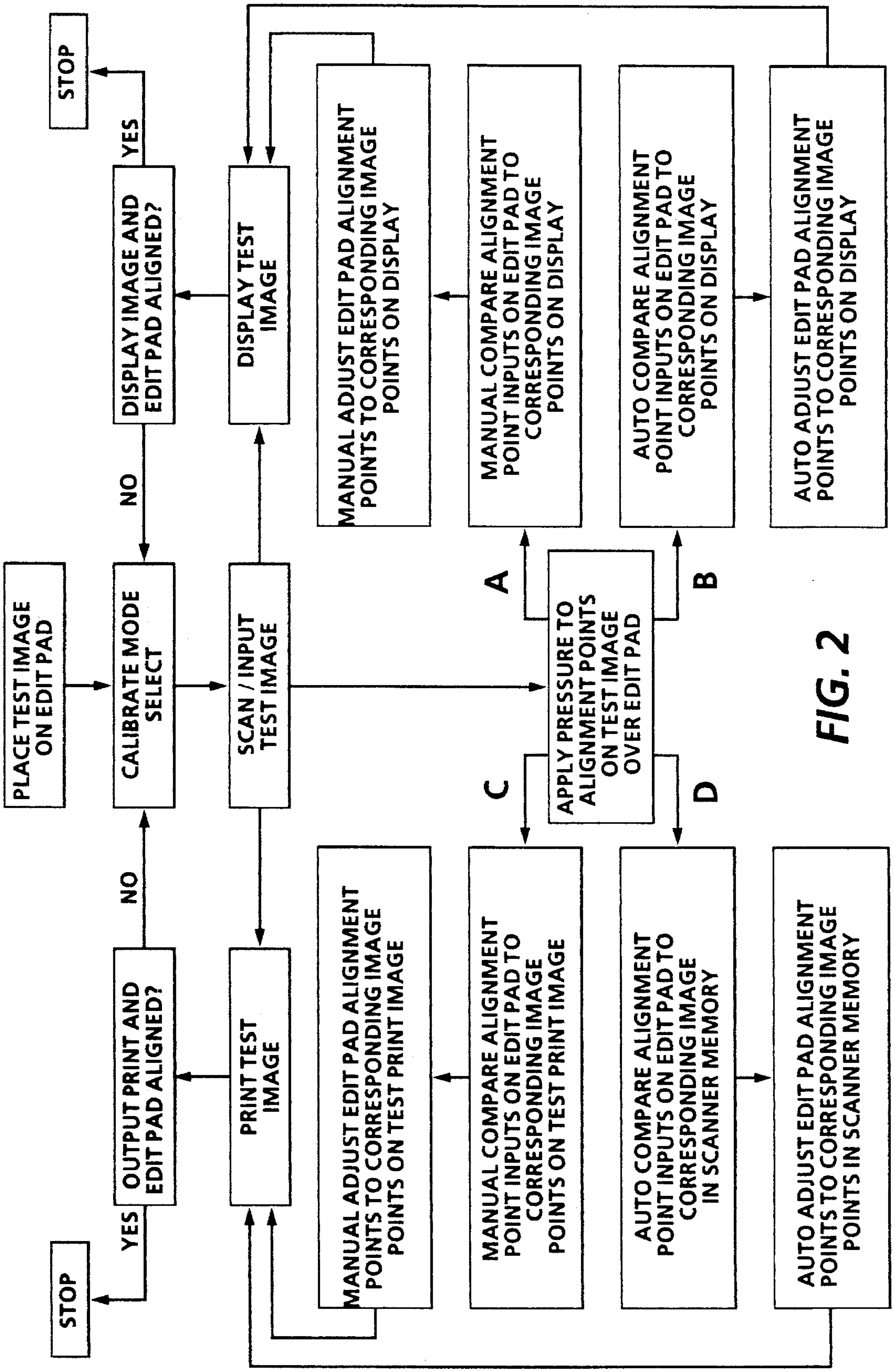
FIG. 2 is a block diagram showing one embodiment of an input pad alignment system of the present invention.

FIG. 2 shows a block diagram of an embodiment of the input pad alignment processing system of the present invention, such as may be employed with the FIG. 1 input pad 150, display 200 and electronic printer (and scanner). In one embodiment, edit pad alignment begins with the placement of the test image on edit pad 150. A user selects the edit pad "Calibrate" mode; thereafter, an electronic test image or pattern (140*c*) is recalled from memory or scanned into the alignment processor. The user thereafter may trace designated points (or lines or figures) onto edit pad 150 by applying pressure to surface 152 according to pattern 140*b* on sheet 138*b*. At this point, four basic subroutines may be selected, according to user preference and processor capability.

According to subroutine A from the "Apply Pressure . . ." block of FIG. 2, a user may select to have the newly inputted points corresponding to image 140*b* traced onto the edit pad to be shown on screen 202 superimposed over the electronically stored image 140*c* scanned into or recalled from processor memory. If image 140*c* (preferably one color or darkness) shows no misalignment with now superimposed image 140*b* (preferably of another color or darkness) as displayed on the screen 202, edit pad 150 is confirmed as being aligned to the processor and screen 202, if image 140*c* was recalled from memory. If image 140*c* was scanned in, edit pad 150 is confirmed as being aligned to the processor, screen 202 and RIS 10 of the printer. If misalignment between the processor, RIS or edit pad is detected, keyboard 202, input pad 150 or other input device (not shown in FIG. 1) may be used to adjust the alignment of patterns 140*b* and 140*c* by resetting and recalibrating the misaligned points of those patterns. The resolved 140*b* and 140*c* test image may then be redisplayed after adjustment; if alignment is correct, this adjustment subroutine is completed; if misalignment is still evident, the manual (or automatic) alignment systems may be reinitiated as shown.

In subroutine B from the "Apply Pressure . . ." block of FIG. 2, a user may select that the newly inputted points corresponding to image 140*b* traced onto the edit pad now be shown on screen 202 superimposed over the electronically stored image 140*c* scanned into or recalled from processor memory. The processor automatically detects (and preferably, displays) image 140*b* to 140*c* alignment. If the processor confirms image 140*c* alignment with now superimposed image 140*b* (as may also be displayed on screen 202), edit pad 150 is aligned to the processor and screen 202, if image 140*c* was recalled from processor memory. If image 140*c* was scanned in, edit pad 150 is confirmed as being aligned to the processor, screen 202 and RIS 10 of the printer. If misalignment with the processor, RIS or edit pad is detected, the processor automatically adjusts the alignment of patterns 140*b* and 140*c* by resetting and recalibrating the misaligned points relative to each other. The resolved 140*b* and 140*c* test image may then be redisplayed after adjustment; if alignment is correct, this adjustment subroutine is completed; if misalignment is still evident, the automatic (or manual) alignment systems may be reinitiated as shown.

According to subroutine C from the "Apply Pressure . . ." block of FIG. 2, a user may select that the newly inputted points corresponding to image 140*b* traced onto edit pad 150 be printed as superimposed over the electronically stored image 140*c* scanned into or recalled from processor memory. If image 140*c* (preferably one color or darkness) shows no misalignment with now superimposed image 140*b* (preferably of another color or darkness) as then displayed on a printed sheet (138*a*), edit pad 150 is confirmed as being aligned to the processor and RIS 10 of the printer. If, according to subroutine C, misalignment between the processor, RIS or edit pad is detected, keyboard 202, input pad 150 or other input device (not shown in FIG. 1) may be used to allow the user to adjust the alignment of patterns 140*b* and 140*c* by resetting and recalibrating the misaligned points. The resolved 140*b* and 140*c* test image may then be reprinted after adjustment; if alignment is proper, this adjustment subroutine is completed; if misalignment is confirmed, the manual (or automatic) alignment systems may be reinitiated as shown.

In subroutine D from the "Apply Pressure . . ." block of FIG. 2, a user may again select that the newly inputted points corresponding to image 140*b* traced onto the edit pad be printed as superimposed over the electronically stored image 140*c* scanned into or recalled from processor memory. If image 140*c* is aligned with superimposed image 140*b* as automatically detected by the processor, (and preferably displayed on a printed sheet 138*a*), edit pad 150 is confirmed as being aligned to the processor and RIS 10 of the printer. If, according to subroutine D, misalignment between the processor, RIS, print or edit pad is detected, the processor automatically adjusts the alignment of patterns 140*b* and 140*c* by resetting and recalibrating the misaligned points. The resolved 140*b* and 140*c* test image may then be verified by the processor and/or reprinted after adjustment; if alignment is proper, this adjustment subroutine is completed; if misalignment is confirmed, the automatic (or manual) alignment systems may be reinitiated as shown.

When edit pad 150 and the processor is used to input, store or determine the z axis coordinates according to a "force component" of the pressure on edit pad 150, calibration of the edit pad may also be accomplished according to subroutines A through D, or independently set according to a preprogrammed settings or user preference. The precise z axis coordinates of pressure on the input pad may be modified and calibrated according to user preference using scale 204 on screen 202. This z axis calibration feature enhances edit pad 150 pressure detecting capability and accuracy.

Figure 3:
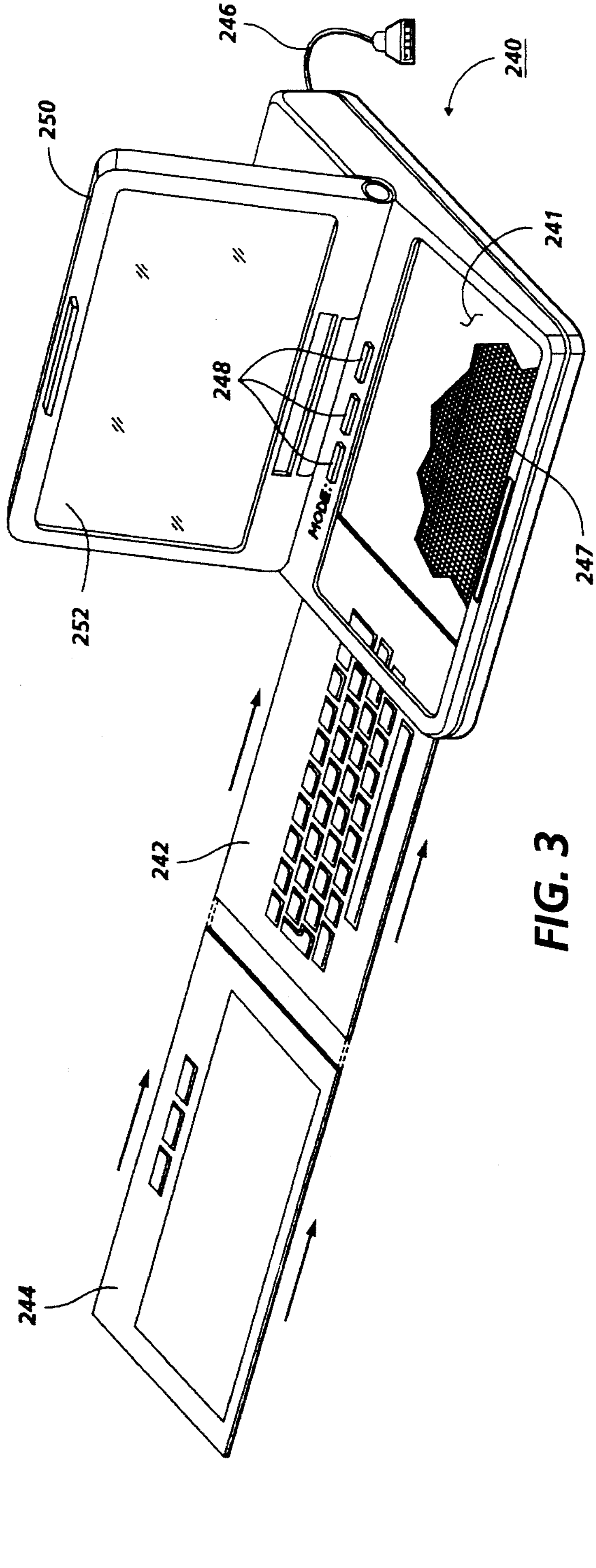
FIG. 3 is a perspective view, partially in section, showing a combined screen, keyboard and edit pad which may incorporate the present invention therein.

FIG. 3 shows a combined screen, keyboard and edit pad terminal 240 that may replace or supplement display 200, keyboard 210 and edit pad 150 as shown in FIG. 1. A keyboard template 242, freehand pallet 244 or other overlay may be placed over protective surface 241 of edit pad 247, such that a variety of tasks may be accomplished using user interface 240. When keyboard template 242 is emplaced in terminal 240, the appropriate keyboard function of the user interface may be initiated; likewise, when freehand pallet 244 (or other template overlay) is inserted in terminal 240, the appropriate drawing function of the user interface may be employed. Edit pad 247 may be calibrated according the the system described in association with FIG. 2 above, such that inputted points corresponding to an image 140*b* traced onto the edit pad 247 may be compared and aligned with stored image 140*c* scanned into or recalled from processor memory, as described in association with FIGS. 1 and 2. Keyboard template 242 and/or freehand template 244 may themselves be adjustably aligned with edit pad 247, as well as with the printer RIS and screen 250, also according the system described in association with FIG. 2. Terminal 240 includes a connector 246 for interfacing with printer 1, RIS 10 or other peripheral devices; mode switches 248 permit the various functions for which user interface 160 is adapted to be selected. Panel 250 supports screen 252 for monitoring edit pad alignment as well as other inputs and outputs to, from and within user interface 240.

While the present invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

I claim:

1. An apparatus including a user interface having an electronically stored image, comprising:

a scanner for inputting a scanned image for defining a scan pattern having a plurality of scan points, each scan point having an x scan input coordinate and a y scan input coordinate;

an edit pad for defining an edit input pattern having a plurality of edit input points, each edit input point having an x edit input coordinate and a y edit input coordinate; and a processor for comparing the scanned image to the edit input pattern, wherein said processor being operable to calibrate each edit input point relative to each corresponding scanned image point and to adjustably align the edit input pattern with the scanned image.

2. The apparatus of claim 1, wherein said processor provides an alignment detection output for indicating when the edit input pattern is misaligned with the scanned image stored in the processor.

3. The apparatus of claim 2, further comprising a printer for displaying the alignment detection output.

4. The apparatus of claim 2, further comprising a screen for displaying the alignment detection output.

5. The apparatus of claim 2, wherein:

said edit pad is adapted to accept a set of coordinate correction inputs and;

said processor comprises a scaled alignment circuit for individually aligning each coordinate of each edit input point in the edit input pattern with each corresponding scanned image coordinate of each scanned image point in the scanned image according to the set of coordinate correction inputs on said edit pad.

6. The apparatus of claim 2, wherein said processor is adapted to generate a set of coordinate correction inputs, and wherein said processor comprises an automatic alignment circuit for individually aligning each coordinate of each edit input point of said edit input input pattern with each corresponding scanned image point of the scanned image according to a set of coordinate correction inputs from said processor.

7. The apparatus of claim 2, wherein said edit pad comprises a pressure sensitive surface.

8. The apparatus of claim 7, wherein each edit input point of said edit input pattern is further defined by a z input coordinate according to a magnitude of pressure applied to said surface and wherein each scanned image point of said scanned image includes a z image coordinate associated with each corresponding scanned z input coordinate of each edit input point of said edit input pattern.

9. The apparatus of claim 7, wherein said processor comprises an automatic alignment circuit for individually aligning each coordinate of each edit input point of said edit input pattern with each corresponding scanned image point of the scanned image according to the set of coordinate correction inputs from said processor.

10. The apparatus of claim 7, further comprising a printer for displaying said alignment detection output.

11. The apparatus of claim 7, further comprising a screen for displaying said alignment detection output.

12. The The electrophotographic printing machine of claim 7, wherein said processor comprises an automatic alignment circuit for individually aligning each coordinate of each edit input point of said edit input pattern with each corresponding scanned image point of the scanned image according to the set of coordinate correction inputs from said processor.

13. An electrophotographic printing machine, comprising:

a scanner for inputting a scanned image for defining a scan pattern having a plurality of scan points, each scan point having an x scan input coordinate and a y scan input coordinate;

an edit pad for defining an edit input pattern having a plurality of edit input points, each edit input point having an x edit input coordinate and a y edit input coordinate; and a processor for comparing the scanned image and the edit input pattern, wherein said processor being operable to calibrate each edit input point relative to each corresponding scanned image point and to adjustably align the edit input pattern with the scanned image.

14. The electrophotographic printing machine of claim 1, wherein said processor provides an alignment detection output for indicating when the edit input pattern is misaligned with the scanned image stored in the processor.

15. The electrophotographic printing machine of claim 14, wherein the alignment detection output is printed on a sheet.

16. The electrophotographic printing machine of claim 14, further comprising a screen for displaying the alignment detection output.

17. The electrophotographic printing machine of claim 14, wherein:

said edit pad is adapted to accept a set of coordinate correction inputs; and;

said processor comprises a scaled alignment circuit for individually aligning each coordinate of each edit input point in the edit input pattern with each corresponding scanned image coordinate of each scanned image point in the scanned image according to the set of coordinate correction inputs on said edit pad.

18. The electrophotographic printing machine of claim 14, wherein said processor is adapted to generate a set of coordinate correction inputs, and wherein said processor comprises an automatic alignment circuit for individually aligning each coordinate of each edit input point of said edit input input pattern with each corresponding scanned image point of the scanned image according to a set of coordinate correction inputs from said processor.

19. The electrophotographic printing machine of claim 14, wherein said alignment detection output is printed on a sheet.

20. The electrophotographic printing machine of claim 14, further comprising a screen for displaying said alignment detection output.

21. The electrophotographic printing machine of claim 20, wherein said edit pad comprises a pressure sensitive surface.

22. The electrophotographic printing machine of claim 21, wherein each edit input point of said edit input pattern is further defined by a z input coordinate according to a magnitude of pressure applied to said surface and wherein each scanned image point of said scanned image includes a z image coordinate associated with each corresponding scanned z input coordinate of each edit input point of said edit input pattern.

* * * * *